United States Patent [19]
Kimura

[11] Patent Number: 5,357,149
[45] Date of Patent: Oct. 18, 1994

[54] TEMPERATURE SENSOR CIRCUIT AND CONSTANT-CURRENT CIRCUIT

[75] Inventor: Katsuji Kimura, Tokyo, Japan
[73] Assignee: NEC Corporation, Tokyo, Japan
[21] Appl. No.: 873,228
[22] Filed: Apr. 24, 1992

[30] Foreign Application Priority Data

Aug. 9, 1991 [JP] Japan .................. 3-224897
Jan. 14, 1992 [JP] Japan .................. 4-024558

[51] Int. Cl.$^5$ .......... H01L 31/00; H03K 3/01; G06G 7/12
[52] U.S. Cl. ................. 307/310; 307/296.6; 307/296.8; 307/491; 307/494
[58] Field of Search .......... 307/310, 296.6, 296.8, 307/491, 494

[56] References Cited

U.S. PATENT DOCUMENTS

| | | | |
|---|---|---|---|
| 4,657,658 | 4/1987 | Sibbald | 307/310 |
| 4,714,901 | 12/1987 | Jain et al. | 307/310 |
| 4,994,688 | 2/1991 | Horiguchi et al. | 307/310 |
| 5,157,285 | 10/1992 | Allen | 307/310 |
| 5,200,654 | 4/1993 | Archer | 307/310 |

FOREIGN PATENT DOCUMENTS

64-77208 3/1989 Japan .

OTHER PUBLICATIONS

VITTOZ et al., "CMOS Analog Integrated Circuits Based on Weak Inversion Operation", IEEE Journal of Solid–State Circuits, vol. SC–12, No. 3, Jun. 1977, pp. 224–231.
VLSI Design Techniques for Analog and Digital Circuits, pp. 363, published by McGraw–Hill, 1990.

*Primary Examiner*—Timothy P. Callahan
*Assistant Examiner*—Trong Phan
*Attorney, Agent, or Firm*—Sughrue, Mion, Zinn, Macpeak & Seas

[57] ABSTRACT

A temperature sensor circuit with a differential output, a differential pair circuit and a feedback circuit. The differential pair circuit has a first MOS transistor whose gate is connected to an output terminal of the temperature sensor circuit and to a reference voltage and a second MOS transistor whose source is connected to the source of the first MOS transistor. The capacity ratios, or gate-width and gate-length ratios (W/L) of the first and second MOS transistors are different. The first and second MOS transistors have a load circuit connected to their drains and a constant current source connected to their sources. The output voltage of the differential pair circuit is connected to the other output terminal of the temperature sensor circuit, as well as to the gate of the second MOS transistor thereby feedback-controlling the differential pair circuit so that the drain currents of the first and second MOS translators are equal to each other. The load is a current mirror circuit, that has two MOS transistors whose gate-width and gate-length ratios are either different from or equal to each other.

9 Claims, 8 Drawing Sheets

TEMPERATURE SENSOR CIRCUIT AND CONSTANT-CURRENT CIRCUIT

BACKGROUND OF THE INVENTION

1. Field of the Invention

This invention relates to a temperature sensor circuit and a constant-current circuit, and more particularly, to a temperature sensor circuit and a constant-current circuit which are formed of MOS transistors on a MOS-type integrated circuit.

2. Description of the Related Art

Figure 1:
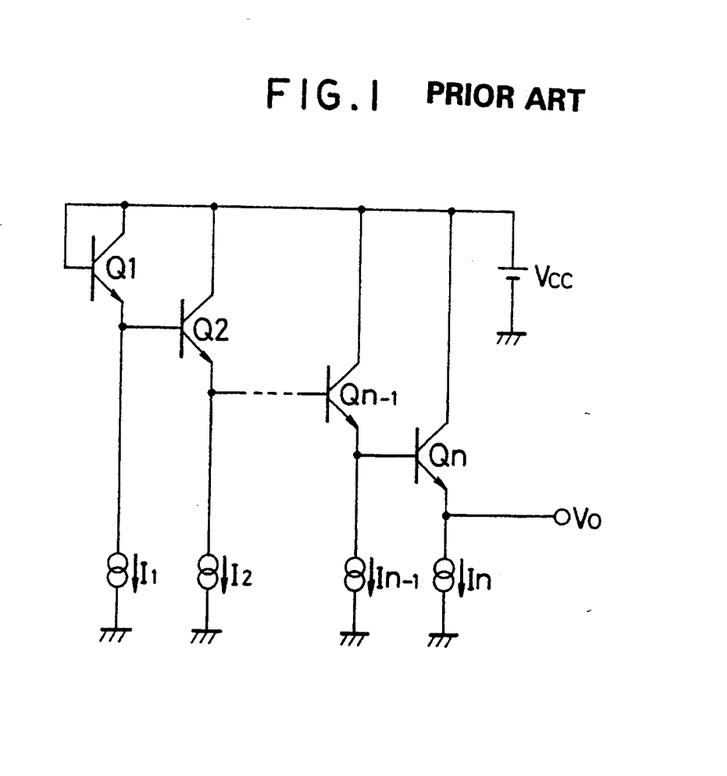
FIG. 1 is a circuit diagram showing an example of a conventional temperature sensor circuit.
Figure 2:
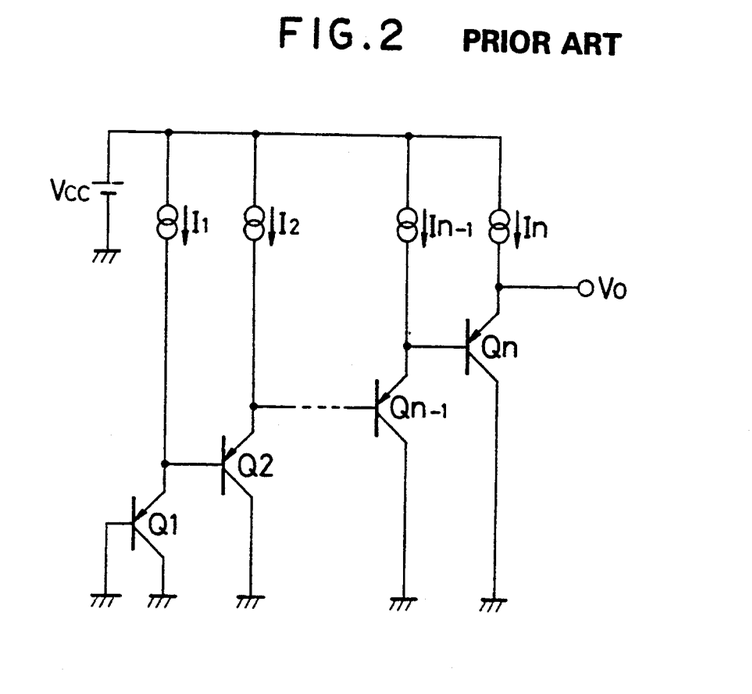
FIG. 2 is a circuit diagram showing another example of a conventional temperature sensor circuit.

A conventional temperature sensor circuit is formed of bipolar transistors in general as shown in FIGS. 1 and 2. The circuits shown in FIGS. 1 and 2 each comprises n transistors Q1, Q2, ..., Qn of either npn- or pnp-type, n constant-current sources for supplying n constant currents I1, I2, .... In respectively to the n transistors Q1, Q2, ..., Qn, and a constant-voltage source for applying a constant voltage Vcc to each of the n transistors Q1. Q2, ..., Qn. The operation of these circuits will be explained below.

In FIG. 1 or 2, supposing that a current and saturation current of each transistor Qj (j=1, 2, ..., n−1, n) are expressed as Ij and Is, respectively, the Boltzmann constant is expressed as k, absolute temperature is expressed as T, the unit electronic charge is expressed as q and a base-to-emitter voltage of the transistor Qj is expressed as VBEj, the current Ij (j=1, 2, ..., n−1, n) of each of the n constant-current sources can be shown as follows:

$$Ij = Is \cdot \exp\left(\frac{qVBEj}{kT}\right) \tag{1}$$

Here, supposing that the direct current amplification factor of the transistor Qj is sufficiently high and the base current thereof is negligible, the base-to-emitter voltage VBEj of the transistor Qj can be shown as follows;

$$VBEj = -\frac{kT}{q} \ln\left(\frac{Ij}{Is}\right) \tag{2}$$

As a result, in the circuit shown in FIG. 1, an output voltage Vo of the circuit can be shown as follows;

$$Vo = \sum_{j=1}^{n} VBEj = -\frac{kT}{q}\left\{\sum_{j=1}^{n} \ln\left(\frac{Ij}{Is}\right)\right\} \tag{3}$$

On the other hand, in the circuit shown in FIG. 2, the difference (Vcc-Vo) between the voltage Vcc of the constant-voltage source and the output voltage Vo of the circuit can be shown as follows;

$$Vcc - Vo = \sum_{j=1}^{n} VBEj = -\frac{kT}{q}\left\{\sum_{j=1}^{n} \ln\left(\frac{Ij}{Is}\right)\right\} \tag{4}$$

As seen from Eqs. (3) and (4), in the temperature sensor circuit shown in either FIG. 1 or 2, the voltage proportional to absolute temperature T can be obtained, This means that the temperature at a position where the temperature sensor circuit is disposed can be detected.

However, if such a conventional temperature sensor circuit as expressed above is to be realized on an MOS-type integrated circuit by using MOS transistors instead of bipolar transistors, it is difficult to obtain a sufficiently large direct current amplification factor due to the fact that the MOS integrated circuit uses parasitic bipolar transistors, so that the actual output voltage Vo is largely deviated from a value calculated from Eq. (3) or (4), thus arising such a problem that it is disadvantageous to be practically used.

In addition, in case of receiving an output of the temperature sensor circuit by, for example, an A/D converter, since the above-mentioned conventional temperature sensor circuit is not of a differential output type, a reference voltage source is disadvantageously necessary to be used additionally. If the reference voltage source is used additionally, the temperature characteristic that it has may degrade the characteristics of the temperature sensor circuit itself.

Figure 3:
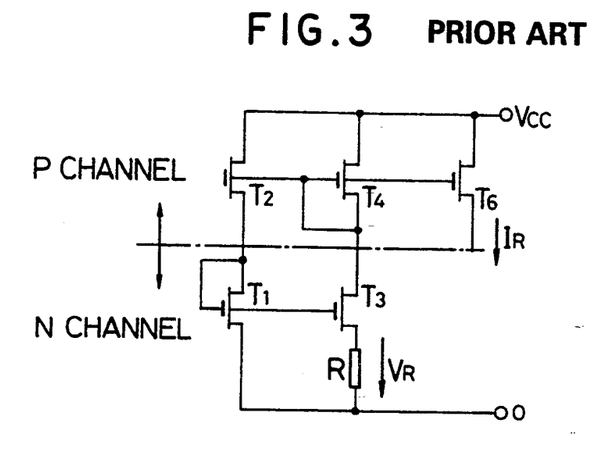
FIG. 3 is a circuit diagram showing an example of a conventional constant-current circuit.
Figure 4:
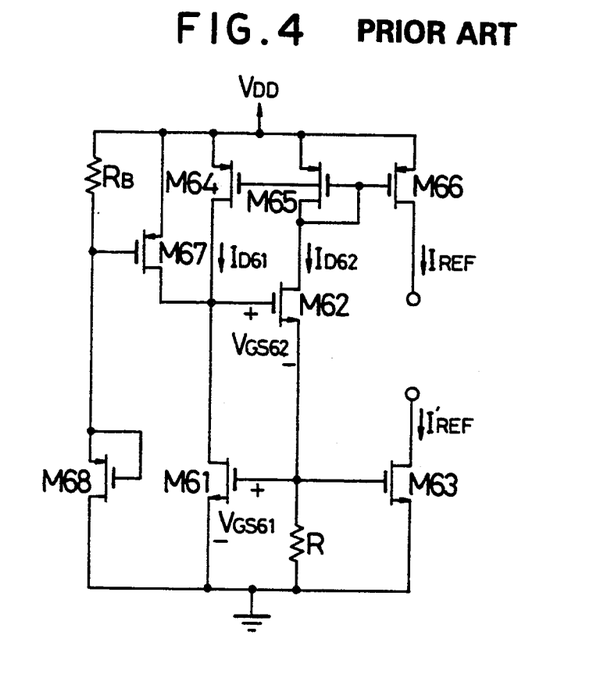
FIG. 4 is a circuit diagram showing another example of a conventional constant-current circuit.

Next, as a constant-current circuit formed of MOS transistors, a circuit as shown in either FIG. 3 or 4 is well-known conventionally.

The constant-current circuit shown in FIG. 3 is one that was disclosed in "IEEE Journal of Solid-State Circuits", Vol. SC-12, No. 3 June 1977, pp. 224 to 231, in which the MOS transistors are operated under the weak inversion state thereby to obtain an output current IR as small as 30 nA to 2 μA.

On the other hand, the circuit as shown in FIG. 4 is disclosed in "VLSI Design Techniques for Analog and Digital Circuits", pp. 363 published by McGraw-Hill, 1990, which is a called boost strapped current source/-sink. In this circuit, a drain current ID61 of a MOS transistor M61 and a drain current ID62 of a MOS transistor M62 are related by the following equations (5) and (6), where VTH is a threshold voltage, KN' is a conductance, L61 is a gate length and W61 is a gate width.

$$ID61 = ID62 \tag{5}$$

$$ID61 = (VTH/R) + (I/R) \cdot (2 \, ID61 \cdot L61/KN' \cdot W61)^{\frac{1}{2}} \tag{6}$$

With the constant-current circuit shown in FIG. 3, the output current is as small as 10 nA to several micro-amperes (μA), resulting in arising such a problem that a practical operational level of current (about several hundreds micro-amperes) cannot be obtained unless otherwise sophisticated more.

With the constant-current circuit shown in FIG. 4, the threshold voltage VTH is varied, so that when taking notice of the manufacturing deviation, the dispersion of the output current is excessively large.

Thus, an object of this invention is to provide a temperature sensor circuit of a differential output type formed of MOS transistors.

Another object of this invention is to provide temperature sensor circuit of a differential output type formed of MOS transistors on a CMOS integrated circuit, Further another object of this invention is to provide a constant-current circuit which is capable of obtaining a current at a value of practical operational level as well as setting the current with no effect by variation of a threshold voltage, thus being adapted to be used for a CMOS integrated circuit.

SUMMARY OF THE INVENTION (1) In a first aspect of this invention, a temperature sensor circuit of a differential output type is provided which is formed of MOS transistors, This circuit includes a differential pair circuit and a feedback circuit. The differential pair circuit includes first and second MOS transistors whose gate-width and gate-length ratio (W/L) are different from each other, a load circuit of the first and second transistors and a constant-current source for driving the first and second transistors. The feedback circuit is supplied from the drain of one MOS transistor of the differential pair circuit with an output voltage of the differential pair circuit thereby feedback-controlling the differential pair circuit so that the drain currents of the first and second MOS transistors can be made equal to each other.

Preferably, the gate of the first MOS transistor of the differential pair circuit is connected to one terminal of the output terminal pair of the temperature sensor circuit to be applied with the reference voltage. The gate of the second MOS transistor is connected to the other terminal of the output terminal pair thereof thereby receiving therethrough a feedback voltage from the feedback circuit.

The load circuit is preferable to comprise a current mirror circuit. In this case, the load circuit preferably comprises two MOS transistors equal in gate-width and gate-length ratio (W/L) to each other.

The temperature sensor circuit of the first aspect of this invention feeds back an output voltage of the feedback circuit to the differential pair circuit to control the drain currents of the first and second transistors thereof to become equal to each other, so that between the two input terminals of the differential pair circuit is obtained a voltage proportional to the temperature. Consequently, such a temperature sensor circuit that is of a differential output type formed of MOS transistors can be obtained with superior characteristics.

The feedback circuit is not limited to that shown above, it may be any other types of circuit if operable in the same manner as above. The load circuit is not limited specifically, but, it is preferable to be a current mirror circuit, particularly preferable to be such a current mirror circuit that comprises two MOS transistors whose gate-width and gate-length ratio are equal to each other.

(2) In a second aspect of this invention, a temperature sensor circuit of a differential output type is provided which is adapted to be formed of CMOS transistors on a CMOS integrated circuit.

The temperature sensor circuit of this aspect comprises a differential pair circuit having two MOS transistors different in gate-width and gate-length ratio (W/L) from each other and to be driven through a constant-current source, a current mirror circuit comprising two MOS transistors different in gate-width and gate-length ratio from each other and constituting a load of the differential pair circuit, and a feedback circuit for feeding back an output of the current mirror circuit to the gate of one MOS transistor of the differential pair circuit so that the drain current ratio of the differential pair circuit can be made equal to the mirror ratio of the current mirror circuit.

The feedback circuit is not limited to that shown above, it may be any other types of circuit if operable in the same manner as above. However, it is preferable to be a complementary circuit using two MOS transistors different in polarity from each other.

The circuit of this aspect feeds back an output of the current mirror circuit to the differential pair circuit to control the drain current ratio of the differential pair circuit to be made equal to the mirror ratio of the current mirror circuit, thus being capable of obtaining a voltage proportional to temperature between the two input terminals of the differential pair circuit. As a result, the temperature sensor circuit of a differential output type can be realized on a CMOS integrated circuit using CMOS transistors.

Different from the temperature sensor circuit of the first aspect in which the output voltage is generated only by the two MOS transistors of the differential pair circuit, the temperature sensor circuit of this aspect generates the output voltage by the two MOS transistors of the differential pair circuit and the two MOS transistors of the current mirror circuit constituting the load thereof, thus resulting in the generation of higher output voltage. As a result, the same output voltage can be generated by further small-sized transistors, thus being capable of making the chip area smaller.

(3) In a third aspect of this invention, a constant-current circuit is provided which is adapted to be used for making CMOS integrated circuits, in which there may be two types of circuit, first and second.

The constant-current circuit of the first type comprises a current mirror circuit comprising two MOS transistors different in gate-width and gate-length ratio (W/L) from each other, a first MOS transistor and a second MOS transistor whose gate-width and gate-length ratios are different from or equal to each other. The first MOS transistor has the drain and gate connected through a resistor to each other and is supplied through the resistor with a driving current from one MOS transistor of the current mirror circuit. The second MOS transistor has the gate connected to the drain of the first MOS transistor and the drain directly receiving the driving current from the other MOS transistor of the current mirror circuit. And, the first and second MOS transistors are structured to be operable at a constant current ratio.

The constant-current circuit of the second type of this aspect also comprises a current mirror circuit comprising two MOS transistors different in gate-width and gate-length ratio from each other and a first MOS transistor and second MOS transistor whose gate-width and gate-length ratios are different from or equal to each other. In which, the first and second MOS transistors are structured to be operable at a constant current ratio as in the first type of this aspect, but different therefrom as follows; Namely, in this type, the first MOS transistor has, the drain and gate connected directly to each other and receives a driving current directly from the current mirror circuit, and on the other hand, the second MOS transistor has the source connected to a resistor and the gate connected to the drain of the first MOS transistor thereby directly receiving the driving current from the current mirror circuit.

Each of the constant-current circuits of the third aspect has the first and second MOS transistors operable at a constant driving current ratio, which means that the driving currents can be generated with no effect by the variation of the power source voltage and the dispersion of the threshold voltage. Accordingly, the dispersion of an output current can be made small with respect to the deviation in production and yet, the current can be set independently of the threshold voltage. Consequently, a constant-current circuit adapted to be used for making a CMOS integrated circuit can be realized.

In order to operate the first and second MOS transistors at a constant drain current ratio, there may be three methods as follows; A first method is that the first and second MOS transistors to be driven are made different in gate-width and gate-length ratio (W/L) and the two MOS transistors constituting the current mirror circuit are also made different in gate-width and gate-length ratio from each other. A second one is that the two MOS transistors to be driven are made different in gate-width and gate-length ratio and the two MOS transistors constituting the current mirror circuit are made equal in gate-width and gate-length ratio to each other. A third one is that the two MOS transistors to be driven are made equal in gate-width and gate-length ratio to each other and the two MOS transistors constituting the current mirror circuit are made different in gate-width and gate-length ratio from each other.

Out of the three methods shown above, in the second method, the driving current has an effect due to threshold voltage, so that if the threshold voltage has a production deviation-caused variation, the output current may be varied to be dispersed. In consideration of this point, either first or second method is preferable to be used in that it has no such difficult point.

The first and second MOS transistors and the two MOS transistors constituting the current mirror circuit are preferable to be different in polarity from each other. This means that if the first and second MOS transistors are of an n-channel type, the two MOS transistors of the current mirror circuit will be preferable to be of a p-channel type, and on the other hand, if the former transistors are of a p-channel type, the latter ones will be preferable to be an n-channel type. Thus, such a circuit that is structured preferably as shown above is further adapted to be used for making a CMOS integrated circuit than that using the same polarity.

DESCRIPTION OF THE PREFERRED EMBODIMENTS

The preferred embodiments of this invention will be described below while referring to FIGS. 5 to 12.

First Embodiment

Figure 5:
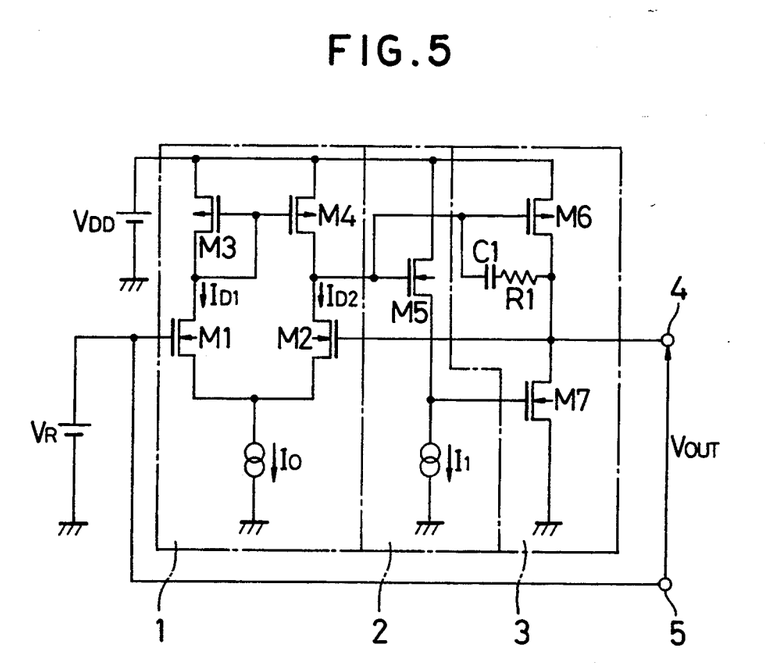
FIG. 5 is a circuit diagram of a temperature sensor circuit according to a first embodiment of this invention.

FIG. 5 shows a temperature sensor circuit according to a first embodiment of this invention, which comprises a differential pair circuit 1, a level shift circuit 2 and an output stage circuit 3.

The differential pair circuit 1 has two n-channel MOS transistors M1 and M2 whose sources are connected in common to each other to be grounded through a constant current source, The both transistors M1 and M2 are driven by a constant current I0 supplied from the constant current source, The gate of the MOS transistor M1 is applied with a reference voltage VR from a reference voltage source, and connected to one output terminal 5. The gate of the transistor M2 is connected to the other output terminal 4. The both transistors M1 and M2 are different in gate-width and gate-length ratio (W/L) from each other.

The drains of the transistor Mt and M2 are connected to the drains of two p-channel MOS transistors M3 and M4 constituting the load thereof, respectively. The gates of the transistors M3 and M4 are connected in common to each other to be connected to the drain of the transistor M1. The transistors M3 and M4 are equal in gate-width and gate-length ratio (W/L) to each other, and the sources thereof are applied with a constant voltage VDD from the constant-voltage source, The both transistors M3 and M4 constitute a current mirror circuit.

The level shift circuit 2 comprises an n-channel MOS transistor M5 whose gate is connected to the drain of the MOS transistor M2. The transistor M5 is grounded through a constant-current source connected to the source thereof, and to be driven by a constant current I1 supplied from this constant current source. The gate of the transistor M5 is connected to the connection point of the drains of the transistors M2 and M4 to receive an output voltage of the differential pair circuit 1 therethrough. The drain of the transistor M5 is supplied with the constant voltage VDD.

The output stage circuit 3 is a complementary circuit including a p-channel MOS transistor M6 and an n-channel MOS transistor M7 whose drains are connected to each other. Between the drain and the gate of the transistor M6, a resistor R1 and a capacitor C1 are inserted for the phase correction use. The gate of the transistor M6 is applied with the output voltage of the differential pair circuit 1 and the source thereof is supplied with the constant voltage VDD. The source of the transistor M7 is grounded. To the connection point of the drains of the transistors M6 and M7 are connected the gate of the transistor M2 and the output terminal 4. The gate of the transistor M7 is connected to the connection point of the transistor M5 and the constant current source to receive the voltage at that point. An output voltage Vout is taken out between the output terminal pair 4 and 5.

The level shift circuit 2 and output stage circuit 3 arranged as above constitute a feedback circuit which controls the differential pair circuit 1 so that a drain current ID1 of the MOS transistor M1 and a drain current ID2 of the MOS transistor M2 are equal to each other. The feedback circuit feeds back the output voltage thereof to the gate of the transistor M2 of the differential pair circuit 1 so as to make the drain current ID1 and ID2 of the transistors M1 and M2 thereof equal to each other.

The feedback circuit is not limited to the circuit shown in FIG. 5, but any other types of circuit may be used if they effect the same feedback operation as above.

Next, the operation and characteristic of this circuit will be explained below.

Supposing that the gate-width and gate-length ratios of the transistors M1 and M2 are expressed as W1/L1 and W2/L2, respectively, the drain currents thereof are expressed as ID1 and ID2, respectively, the threshold voltage is expressed as VTH, the transconductance parameter is expressed as $\beta 1$ and the difference between a gate-to-source voltage VGS1 of the transistor M1 and a gate-to-source voltage, VGS2 of the transistor M2 is expressed as $\Delta Vi$, the following equations can be established;

$$ID1 = \beta 1 (VGS1 - VTH)^2 \quad (11)$$

$$ID2 = K \cdot \beta 1 (VGS2 - VTH)^2 \quad (12)$$

$$ID1 + ID2 = I0 \quad (13)$$

$$\Delta Vi = VGS1 - VGS2 \quad (14)$$

Here, if the mobility of electron is $\mu$ and the capacity of a gate oxide film is Cox, $\beta 1$ and K in these equations can be expressed as follows;

$$\beta 1 = \mu (Cox/2) \cdot (W1/L1) \quad (15)$$

$$K = (W2/L2)/(W1/L1) \quad (16)$$

In this case, the drain currents ID1 and ID2 of the MOS transistors M1 and M2 of the differential pair circuit 1 are always equal to each other by feedback-controlling through the level shift circuit 2, and output stage circuit 3. As a result, from Eq. (13), the following can be obtained:

$$ID1 = ID2 = (\tfrac{1}{2}) \cdot I0 \quad (17)$$

Hence, Eqs. (11) and (12) can be changed respectively as follows;

$$\{(\tfrac{1}{2})(I0/\beta 1)\}^{\tfrac{1}{2}} = VGS1 - VTH \quad (18)$$

$$\{(\tfrac{1}{2})(I0/K \cdot \beta 1)\}^{\tfrac{1}{2}} = VGS2 - VTH \quad (19)$$

If the difference between the gate-to-source voltages VGS1 and VGS2 of respective MOS transistors M1 and M2 when Eq. (17) is established, which is equal to the input voltage of the differential pair circuit 1 and the output voltage VOUT, is expressed as $(\Delta Vi)0$, it can be obtained by subtracting Eq. (18) from Eq. (19), or $$\begin{aligned}(\Delta Vi)0 &= (I0/2\beta 1)^{\tfrac{1}{2}} \cdot (1 - 1/K^{\tfrac{1}{2}}) \\ &= (1/\mu^{\tfrac{1}{2}}) \cdot (I0/Cox)^{\tfrac{1}{2}} \times \\ & \quad [\{1/(W1/L1)^{\tfrac{1}{2}}\} - \{1/(W2/L2)^{\tfrac{1}{2}}\}]\end{aligned} \quad (20)$$

As a result, in the circuit shown in FIG. 5, it can be found that by controlling the differential pair circuit 1 so as to make the drain currents ID1 and ID2 equal to each other, the difference $(\Delta Vi)0$ between the gate-to-source voltages VGS1 and VGS2 of the transistors M1 and M2 thereof, or the output voltage VOUT is varied inversely proportionally to the square root of the mobility $\mu$.

The mobility $\mu$ is a function of temperature, and the relationship of the mobility $\mu$ (T1) at absolute temperature T1 and the mobility $\mu$ (T2) at absolute temperature T2 can be expressed as follows;

$$\mu(T2)/\mu(T1) = (T2/T1)^{-3/2} \quad (21)$$

Namely, the mobility ratio at the temperature T1 and T2 is varied inversely proportionally to the square root of the temperature ratio raised to the third power, or $(T2/T1)^{3/2}$.

Here, from Eqs. (20) and (21), the following equation (22) can be obtained;

$$(\Delta Vi(T))0 \propto 1/\mu(T)^{\tfrac{1}{2}} = (1/\mu(T0)^{\tfrac{1}{2}}) \cdot (T/T0)^{\tfrac{3}{4}} \quad (22)$$

From Eq. (22), it can be found that when the drain currents ID1 and ID2 of respective transistors M1 and M2 are equal to each other, the gate-to-source voltage difference $(\Delta Vi)0$ between the transistors M1 and M2, or the output voltage VOUT is varied proportionally to the fourth root of the ratio of absolute temperature T and the reference absolute temperature T0 raised to the third power, or $(T/T0)^{\tfrac{3}{4}}$.

Figure 6:
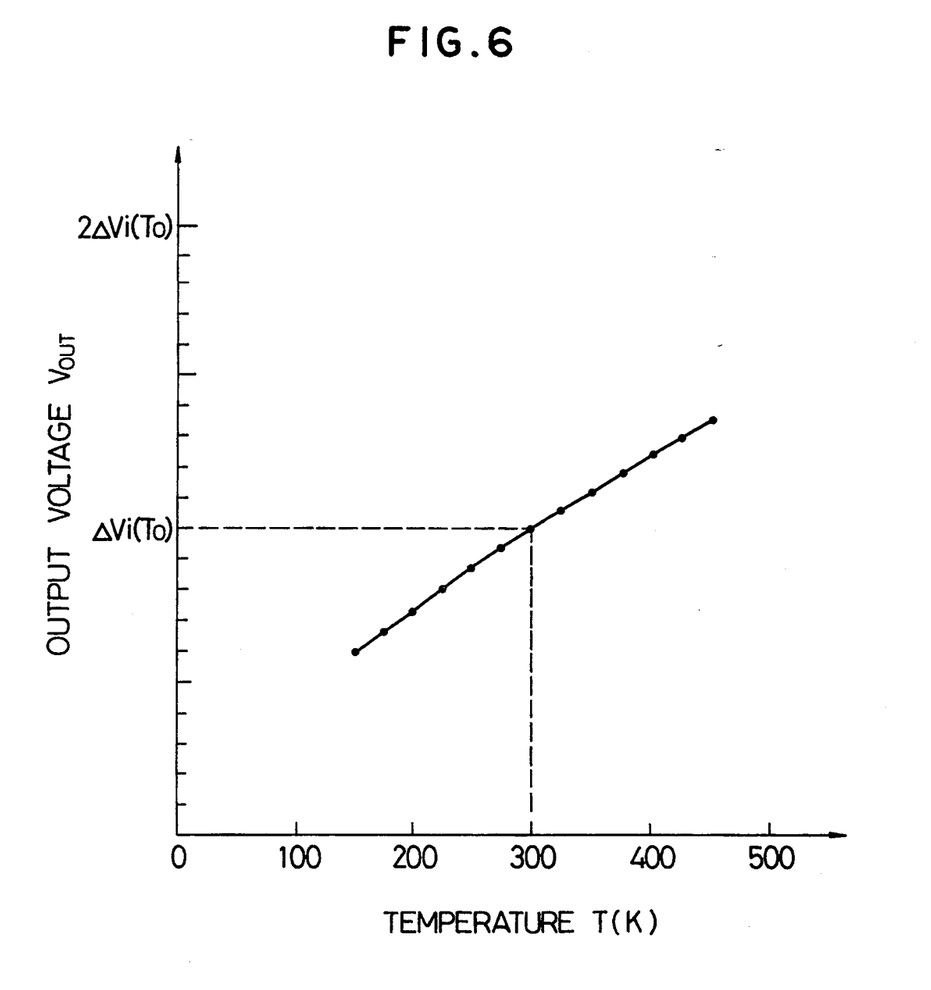
FIG. 6 is a graph showing a relation of an output voltage and a temperature of the temperature sensor circuit shown in FIG. 5.

Eq. (22) when T0=300K is graphically shown in FIG. 6, from which it can be found that the output voltage VOUT is nearly proportional to absolute temperature T.

As explained above, the circuit of this embodiment feedback-controls so that the drain currents ID1 and ID2 of respective transistors M1 and M2 of the differential pair circuit 1 are made equal to each other. Consequently, the temperature sensor circuit of a differential output type using MOS transistors can be realized.

Second Embodiment

Figure 7:
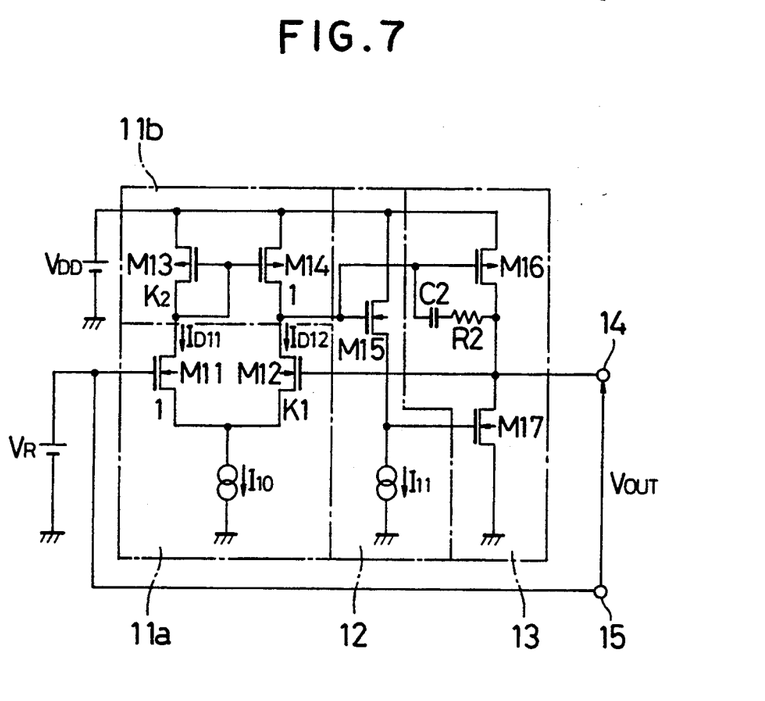
FIG. 7 is a circuit diagram of a temperature sensor circuit according to a second embodiment of this invention.

FIG. 7 shows a temperature sensor circuit according to a second embodiment of this invention, which comprises a differential pair circuit consisting of a differential transistor pair 11a and a current mirror circuit 11b, a level shift circuit 12 and an output stage circuit 13.

In FIG. 7, the differential transistor pair 11a has, as in the first embodiment, two n-channel MOS transistors M11 and M12 whose sources are connected in common to each other. The transistors M11 and M12 are grounded through a constant current source, and driven by a constant current I10 supplied therefrom. The gate of the transistor M11 is applied with a reference voltage VR from a reference voltage source, and connected to one output terminal 15. The gate of the transistor M12 is connected to the other output terminal 14.

The transistors M11 and M12 are different in gate-width and gate-length ratio from each other, and when the gate-width and gate-length ratio of the transistor M11, or W11/L11 is made one (1), that of the transistor M12, or W12/L12 becomes K1.

The current mirror circuit 11b constitutes an active load of the differential transistor pair 11a, and has two p-channel MOS transistors M13 and M14. The drains of the transistors M13 and M14 are connected respectively to the drains of the transistors M11 and M12, and the gates of the transistors M13 and M14 are connected in common to be connected to the drain of the transistor M13. The sources of the transistors M13 and M14 are supplied with a constant voltage VDD from a constant voltage source.

The transistors M13 and M14 are different in gate-width and gate-length ratio from each Other, and when the gate-width and gate-length ratio of the transistor M14, or W14/L14 is made one (1) that of the transistor M13 or W13/L13 becomes K2, meaning that the mirror ratio of the transistors M13 and M14 is K2:1.

The current mirror circuit 11b of this embodiment resembles in structure to the lead circuit including the MOS transistors M3 and M4 of the first embodiment, but different therefrom in that two MOS transistors M3 and M4 of the first embodiment are equal in gate-width and gate-length ratio to each other.

The level shift circuit 12 has an n-channel MOS transistor M15 grounded through a constant current source connected to the source thereof. The transistor M15 is driven by a constant current I11 supplied from the constant current source. To the gate of the transistor M15 is sent an output voltage of the differential pair circuit from the source of the transistor M14 of the current mirror circuit 11b. To the drain of the transistor M15 is sent the constant voltage VDD from the constant voltage source.

The output stage circuit 13 has a complementary structure including a p-channel MOS transistor M16 and an n-channel MOS transistor M17 whose drains are connected to each other. The source of the transistor M16 is applied with the constant voltage VDD from the constant voltage source, and the gate thereof is applied with an output voltage of the differential pair circuit. The connection point of the drains of the transistors M16 and M17 is connected to the output terminal 14, In addition, the connection point thereof is connected to the gate of the transistor M12 of the differential pair circuit in order to feed back an output of the output stage circuit 13 to the gate of the transistor M12. Between the gate and drain of the MOS transistor M16, a resistor R2 and a capacitor C2 are inserted for the phase correction use. The output voltage VOUT is taken out between the output terminal pair 14 and 15.

The level shift circuit 12 and output stage circuit constitute a feedback circuit in which an output voltage the current mirror circuit 11b is fed back to the gate of the transistor M12 of the differential pair circuit so that the ratio of the drain currents ID11 and ID12 of respective transistors M11 and M12 becomes equal to the mirror ratio of the current mirror circuit 11b. The level shift circuit 12 and output stage circuit 13 of this second embodiment constitute a feedback circuit as the level shift circuit 2 and output stage circuit 3 of the first embodiment, but being different therefrom in that the circuit of the first embodiment feeds back the output voltage thereto so that the drain currents ID1 and ID2 of the transistors M1 and M2 are made equal to each other.

The feedback circuit is not limited to the circuit shown in FIG. 7, but any other types of circuit may be used if they effect the same feedback operation as above.

Next, the operation of the temperature sensor circuit of this embodiment will be explained below.

Since the ratio of the gate-width and gate-length of the transistor M1 and that of the transistor M2 of the transistor pair 11a is 1:K1, the drain currents ID11 and ID12 thereof can be expressed by the following equations (31) and (34), respectively. In addition, the relationship between the drain currents ID11 and ID12 and the constant current I10 can be expressed by the following equation (33), and the output voltage (input offset voltage) VOUT of this temperature sensor circuit can be expressed by the following equation (34);

$$ID11 = \beta2(VGS11 - VTH)^2 \qquad (31)$$

$$ID12 = K1 \cdot \beta2(VGS12 - VTH)^2 \qquad (32)$$

$$ID11 + ID12 = I10 \qquad (33)$$

$$VOUT = VGS11 - VGS12 \qquad (34)$$

Where VGS11 is a gate-to-source voltage of the MOS transistor M11, VGS12 is a gate-to-source voltage of the MOS transistor M12, and VTH is the threshold voltage thereof. Also, if the mobility is expressed as $\mu$ and the gate oxide film capacity is expressed as Cox, the transconductance parameter $\mu2$ in Eqs. (31) and (32) can be shown as follows;

$$\beta2 = \mu(Cox/2) \cdot (W11/L11) \qquad (35)$$

Since the mirror ratio of the transistors M13 and M14 of the current mirror circuit 11b is K2:1, the differential transistor-pair M11 and M12 is subjected to the feedback control so as to satisfy the following equation (36), or $$ID11 = K2 \cdot ID12 \qquad (36)$$

Hence, from Eqs. (33) and (34), the drain currents ID11 and ID12 can be expressed in terms of the mirror ratio K2 and the constant current I10 as follows;

$$ID11 = \{K2/(K2+1)\} \cdot I10 \qquad (37)$$

$$ID12 = \{1/(K2+1)\} \cdot I10 \qquad (38)$$

Accordingly, from Eqs. (31) and (37), the following equation (39) can be obtained, and from Eq. (39), the following equation (40) can be obtained;

$$\{K2/(K2+1)\} \cdot I10 = \beta2 (VGS11 - VTH)^2 \qquad (39)$$

$$VGS11 - VTH = (I10/\beta2)^{\frac{1}{2}} \cdot \{K2/(K2+1)\}^{1/2} \qquad (40)$$

Similarly, from Eqs. (32) and (38), the following equation (41) can be obtained, and from Eq. (41), the following equation (42) can be obtained;

$$\{1/(K2+1)\} \cdot I10 = K1 \cdot \beta2(VGS12 - VTH)^2 \qquad (41)$$

$$VGS12 - VTH = (I10/K1 \cdot \beta 2)^{\frac{1}{2}} \{1/(K2+1)\}^{\frac{1}{2}} \qquad (42)$$

As a result, Eq. (34) can be expressed as follows:

$$\begin{aligned}
VOUT &= VGS11 - VGS12 \qquad (43)\\
&= (I10/\beta 2)^{\frac{1}{2}} \cdot \{K2/(K2+1)\}^{\frac{1}{2}} \times \\
&\quad [1 - \{1/(K1 \cdot K2)^{\frac{1}{2}}\}]\\
&= (1/\mu^{\frac{1}{2}}) \cdot (2I10/Cox)^{\frac{1}{2}} \cdot \{1/(W11/L11)^{\frac{1}{2}}\} \times \\
&\quad \{K2/(K2+1)\}^{\frac{1}{2}} \cdot [1 - 1/(K1 \cdot K2)^{\frac{1}{2}}]
\end{aligned}$$

It can be seen from Eq. (43) that the output voltage VOUT (input offset voltage of the transistors M11 and M12) is varied inversely proportionally to the square root of the mobility $\mu$.

The mobility $\mu$ is a function of absolute temperature T. Thus, the mobility $\mu$ (T1) at T1 and the mobility $\mu$ (T2) at T2 can be related as follows;

$$\{\mu(T2)/\mu(T1) = (T2/T1)^{-3/2} \qquad (44)$$

As a result, the output voltage VOUT can be expressed in terms of the mobility $\mu$ (T0) at the reference absolute temperature T0 as follows;

$$VOUT \propto \{1/\mu(T)\}^{\frac{1}{2}} = \{1/\mu(T0)\}^{\frac{1}{2}} \cdot (T/T0)^{\frac{3}{4}} \qquad (45)$$

This equation is equal to Eq. (22) in the first embodiment.

Figure 8:
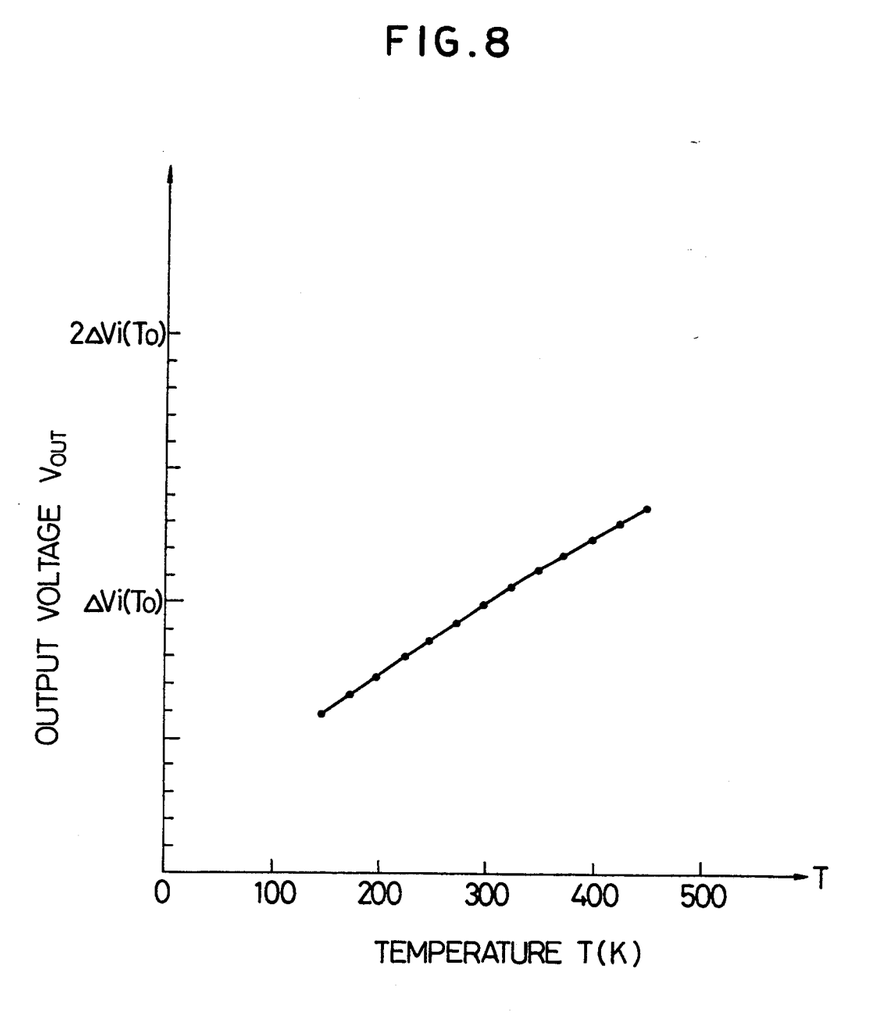
FIG. 8 is a graph showing a relation of an output voltage and a temperature of the temperature sensor circuit shown in FIG. 7.

FIG. 8 graphically shows the relationship expressed by Eq. (45) as T0=300K which shows that the output voltage VOUT is nearly proportional to absolute temperature T.

In Eq. (43), if K2=1, the following equation (46) can be obtained, and if K1=1, the following equation (47) can be obtained:

$$(VOUT)_{K2=1} = (I10/2 \cdot \beta 2)^{\frac{1}{2}} \cdot (1 - 1/K1^{\frac{1}{2}}) \qquad (46)$$

$$(VOUT)_{K1=1} = (I10/\beta 2)^{\frac{1}{2}} \cdot (K2/K2+1)^{\frac{1}{2}} \cdot (1 - 1/K2^{\frac{1}{2}}) \qquad (47)$$

As understood from Eqs. (46) and (47), Eq. (43) is not equivalent with respect to K1 and K2, but if K2>1, the following equation (48) can be obtained;

$$\frac{1}{2}^{\frac{1}{2}} = 0.7071 < \{K2/(K2+1)\}^{\frac{1}{2}} < 1 \qquad (48)$$

In Eq (48) a value of $\{K2/(K2+1)\}^{\frac{1}{2}}$ is subjected to square root compression with respect to the variation of the value of K2 thereby to show the range of variation shown in Eq. (48), which means that this variation range becomes smaller than that of K2. As a result, if K1>1 and K2>1, from Eq. (43), the output voltage VOUT can be roughly estimated to be determined by the inverse number of the square root of the product of K1 and K2 or $\{1/(K1 \cdot K2)\}^{\frac{1}{2}}$. This means that such a circuit that generates the output voltage VOUT (offset voltage) through two transistor pairs (M11 and M12) and (M13 and M14) as in this embodiment is more effective than such a circuit that generates it through only one transistor pair (M11 and M12), for example, as in the first embodiment. Further this means that the same output voltage VOUT can be realized by using smaller-sized transistors, thus being capable of advantageously making the chip area smaller.

As explained above, the temperature sensor circuit according to the second embodiment makes it possible to obtain a voltage proportional to a temperature between the two input terminals of the transistor pair M11 and M12, which means that the temperature sensor circuit of a differential output type can be realized on a CMOS integrated circuit by using complementary MOS transistors.

Third Embodiment

Figure 9:
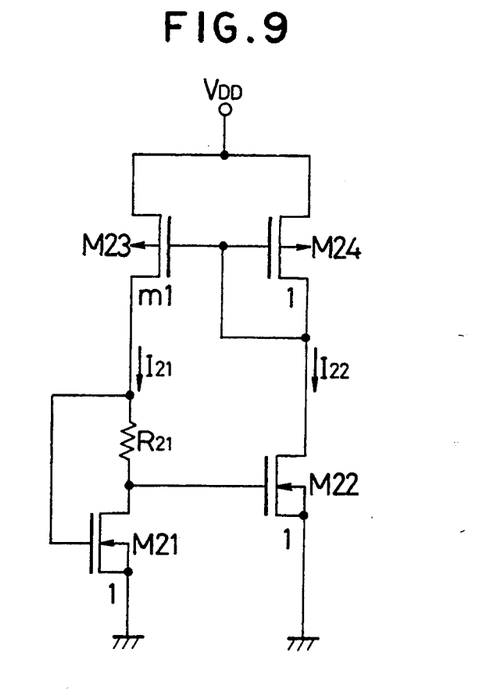
FIG. 9 is a circuit diagram of a constant-current circuit according to a third embodiment of this invention.

FIG. 9 is a circuit diagram of a constant-current circuit according to a third embodiment of this invention, which comprises two n-channel MOS transistors M21 and M22 and two p-channel MOS transistors M23 and M24.

FIG. 9, the source of the n-channel MOS transistor M21 is directly grounded, the drain thereof is connected through a resistor R21 to the drain of the p-channel MOS transistor 23, and the gate and drain thereof are connected through the resistor R21 to each other. The source of the n-channel MOS transistor M22 is directly grounded, the drain thereof is connected to the drain of the transistor M24, and the gate thereof is connected to the drain of the transistor M21. The transistors M21 and M22 constitute a peaking current mirror circuit.

The drain of the p-channel MOS transistor M23 is connected through the resistor R21 to the drain of the transistor M21 and connected directly to the gate of the transistor M21. The drain of the p-channel MOS transistor M24 is connected directly to the drain of the transistor M22. The gates of the transistors M23 and M24 are connected in common to each other to be connected to the drain of the transistor M24. The drains of the transistors M23 and M24 are applied with a constant voltage VDD. The transistors M23 and M24 constitute a simple current mirror circuit to drive the transistors M21 and M22.

In this embodiment, the capacity ratio of the transistors M21 and M22 to be driven, or the gate-width and gate-length ratio (W/L) is 1:1, and on the other hand, the capacity ratio of the transistors M23 and M24 constituting the current mirror circuit is m1:1 (m1>1, or m1<1). As a result, the ratio of the driving current of the transistor M21 and that of the transistor M22 when operating becomes m1:1.

Here, in FIG. 9, when all the transistors M21, M22, M23 and M24 are operating in the saturation region, if a gate-to-source voltage of the transistor M21 is expressed as VGS21, that of the transistor M22 is expressed as VGS22, a threshold voltage thereof is expressed as VTH and a transconductance parameter thereof is expressed as $\beta 3$, a driving current I21 of the transistor M21, a driving current I22 of the transistor M22, and the difference between the gate-to-source voltages VGS21 and VGS22 of respective transistors M21 and M22 can be respectively expressed as follows;

$$I21 = \beta 3(VGS21 - VTH)^2 \qquad (51)$$

$$I22 = \beta 3(VGS22 - VTH)^2 \qquad (52)$$

$$VGS21 - VGS22 = R21 \cdot I21 \qquad (53)$$

The capacity ratio of the transistors M23 and M24 constituting the current mirror circuit is m1:1, so that the driving currents I21 and I22 respectively outputted from the transistors M23 and M24 are related to each other as follows;

$$I21 = m1 \cdot I22 \tag{54}$$

As a result, by solving Eqs. (51) and (52) with respect to VGS21 and VGS22, respectively, and substituting them for those in Eq. (53), the following equation (55) can be obtained;

$$VGS21 - VGS22 = (I21^{\frac{1}{2}} - I22^{\frac{1}{2}})/\beta 3^{\frac{1}{2}} = R21 \cdot I21 \tag{55}$$

From Eqs. (54) and (55), the following equation (56) can be obtained, and by arranging Eq. (56), the following equation (57) can be obtained, and finally, the following equation (58) can be obtained:

$$I21^{\frac{1}{2}} - (I21^{\frac{1}{2}}/m1) = \beta 3^{\frac{1}{2}} \cdot R21 \cdot I21 \tag{56}$$

$$I21^{\frac{1}{2}} \cdot [\beta 3^{\frac{1}{2}} \cdot R21 \cdot I21^{\frac{1}{2}} - \{1 - (1/m1^{3/2})\}] = 0 \tag{57}$$

$$I21^{\frac{1}{2}} = (1 - 1/m1^{\frac{1}{2}})/(\beta 3^{\frac{1}{2}} \cdot R21) \tag{58}$$

Accordingly, the driving currents I21 and I22 can be respectively expressed as follows;

$$I21 = \{(m1^{\frac{1}{2}} - 1)/m1^{\frac{1}{2}}\}^2 \cdot \{1/(\beta 3 \cdot R21^2)\} \tag{59}$$

$$I22 = m1\{(m1^{\frac{1}{2}} - 1)/m1^{\frac{1}{2}}\}^2 \cdot \{1/(\beta 3 \cdot R21^2)\} \tag{60}$$

Eqs. (59) and (60) each does not include the constant voltage VDD and the threshold voltage VTH. From this fact, it can be found that if all the transistors M21, M22, M23 and M24 are being operating in the saturation region, the driving currents I21 and I22 respectively have no effect by their variations. As a result, the circuit shown in FIG. 9 makes it possible to stably supply a constant current at a practical operation level. In addition, if a circuit is provided which takes out the driving currents I21 and 122 as its output current, it can be driven.

Fourth Embodiment

Figure 10:
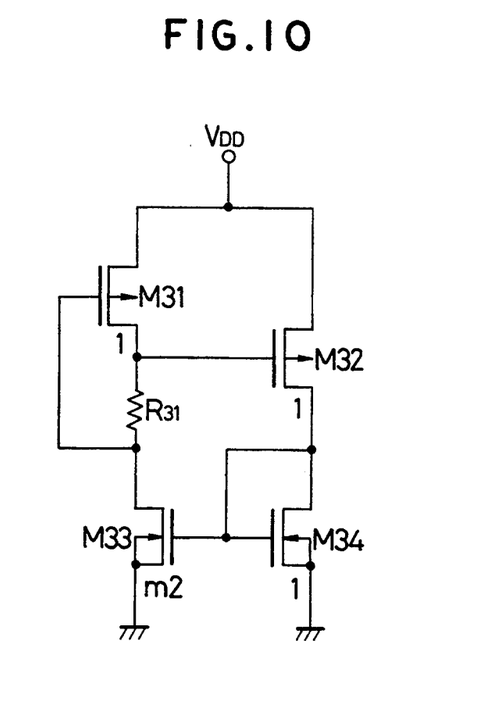
FIG. 10 is a circuit diagram of a constant-current circuit according to a fourth embodiment of this invention.

FIG. 10 is a circuit diagram of a constant-current circuit according to a fourth embodiment of this invention, which comprises two p-channel MOS transistors M31 and M32, and two n-channel MOS transistors M33 and M34 constituting a current mirror circuit for driving the transistors M31 and M32. This circuit is equivalent to such a circuit that the p-channel MOS transistors M31 and M32 are used instead of the n-channel MOS transistors M21 and M22, and the n-channel MOS transistors M33 and M34 are used instead of the p-channel MOS transistors M23 and M24 in the circuit of the third embodiment.

The source of the p-channel MOS transistor M31 is applied with a constant voltage VDD, the drain thereof is connected through a resistor R31 to the drain of the n-channel MOS transistor 33, and the drain and source thereof are connected through the resistor R31 to each other. The source of the p-channel MOS transistor 32 is applied with the constant voltage VDD, the drain thereof is connected directly to the drain of the n-channel MOS transistor M34, and the gate thereof is connected directly to the drain of the transistor M31, The transistors M31 and M32 constitute a peaking current mirror circuit.

The source of the n-channel MOS transistor M33 is directly grounded, and the drain thereof is connected through the resistor R31 to the drain of the transistor M31. The source of the n-channel MOS transistor 34 is directly grounded, and the drain thereof is connected directly to the drain of the transistor M32. The gates of the transistors M33 and M34 are connected in common to each other to be connected to the drain of the transistor M34. The transistors M33 and M34 constitute a simple current mirror circuit for driving the transistors M31 and M32.

In this fourth embodiment, the capacity ratio (W/L) of the transistors M31 and M32 to be driven is 1:1, and that of the transistors, M33 and M34 is m2:1 (m2>1, or m2<1). As a result, the ratio of the driving current of the transistor M31 and that of the transistor M32 when operating becomes m2:1.

In this embodiment, the transistors to be used are made inverse in channel polarity to those to be used in the third embodiment thereby to be operated similarly thereto, so that Eqs. (51) to (60) already described in the third embodiment can be similarly established, which means that the same characteristics as those of the third embodiment are obtainable.

Fifth Embodiment

Figure 11:
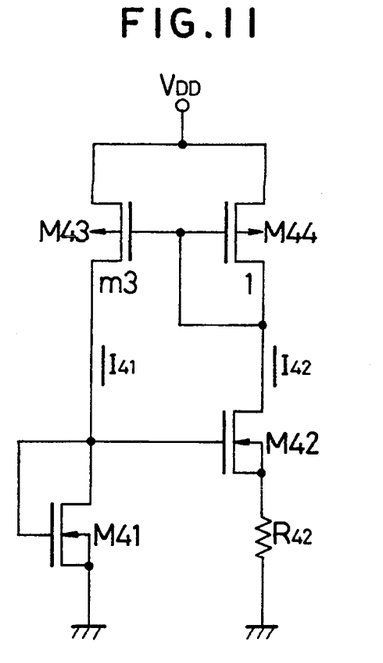
FIG. 11 is a circuit diagram of a constant-current circuit according to a fifth embodiment of this invention.

FIG. 11 is a circuit diagram of a constant-current circuit according to a fifth embodiment of this invention, which is equivalent in structure to the circuit of the third embodiment showing in FIG. 9 modified such that the resistor R21 between the gate and drain of the transistor M21 is removed therefrom and the resistor R21 thus removed is inserted between the source of the transistor M22 and the ground.

In FIG. 11, the source of an n-channel MOS transistor M41 is directly grounded, the drain thereof is connected to the drain of a p-channel MOS transistor M43, and the gate and drain thereof are connected to each other. The source of an n-channel MOS transistor M42 is grounded through a resistor R42, the drain thereof is connected to the drain of a p-channel MOS transistor M44, and the gate thereof is connected to the drain of the transistor M41. The transistors M41 and M42 constitute a Widlar current mirror circuit.

The drain of the p-channel MOS transistor M43 is connected directly to the drain of the transistor M41. The drain of the p-channel MOS transistor M44 is connected directly to the drain of the transistor M42. The gates of the transistors M43 and M44 are connected in common to each other to be connected to the drain of the transistor M42. The drain of each of the transistors M43 and M44 is applied with a constant voltage VDD. The transistors M43 and M44 constitute a simple current mirror circuit for driving the transistors M41 and M42.

In this fifth embodiment, the capacity ratio of the transistors M41 and M42 to be driven is 1:1, and the capacity ratio of the transistors M43 and M44 constituting the current mirror circuit is m3:1, (m3>1, or m3<1). As a result, the ratio of the driving current of the transistor M41 and that of the transistor M42 when operating becomes m3:1.

In the circuit shown in FIG. 11, if all the transistors M41, M42, M43 and M44 are being operating in the saturation region, the driving currents I41 and I42 of the transistors M41 and M42 can be expressed by the following equations (61) and (62), respectively, as in case of being Eqs. (51) and (52), and the gate-to-source voltages VGS41 and VGS42 of the transistors M41 and M42 can be related as expressed by the following equation (63): where $\beta 4$ shows a transconductance parameter of the transistors, $$I41 = \beta 4(VGS41 - VTH)^2 \tag{61}$$

$$I42 = \beta 4(VGS42 - VTH)^2 \tag{62}$$

$$VGS41 - VGS42 = R42 \cdot I42 \tag{63}$$

The capacity ratio of the transistors M43 and M44 is m3:1, so that the driving currents I41 and I42 respectively outputted from the transistors M43 and M44 can be related as follows;

$$I41 = m3 \cdot I42 \tag{64}$$

By solving Eqs. (61) and (62) with respect to VGS41 and VGS42, respectively, and substituting them for those in Eq. (63), the following equation (65) can be obtained;

$$VGS41 - VGS42 = (I41^{\frac{1}{2}} - I42^{\frac{1}{2}})/\beta 4^{\frac{1}{2}} = R42 \cdot I42 \tag{65}$$

From Eqs. (64) and (65), the following equation (66) can be obtained, and by arranging Eq. (66), the following equation (67) can be obtained, and finally, the following equation (68) can be obtained:

$$I42^{\frac{1}{2}} \cdot (m3^{\frac{1}{2}} - 1) = \beta 4^{\frac{1}{2}} \cdot R42 \cdot I42 \tag{66}$$

$$I42^{\frac{1}{2}} \cdot \{(m3^{\frac{1}{2}} - 1) - \beta 4^{\frac{1}{2}} \cdot R42 \cdot I42^{\frac{1}{2}}\} = 0 \tag{67}$$

$$I42^{\frac{1}{2}} = (m3^{\frac{1}{2}} - 1)/(\beta 4^{\frac{1}{2}} \cdot R42) \tag{68}$$

Accordingly, the driving currents I42 and I41 can be respectively expressed as follows;

$$I42 = (m3^{\frac{1}{2}} - 1)^2 / (\beta 4 \cdot R42^2) \tag{69}$$

$$I41 = m3 \cdot (m3^{\frac{1}{2}} - 1)^2 / (\beta 4 \cdot R42^2) \tag{70}$$

Eqs. (69) and (70) each does not include the constant voltage VDD and the threshold voltage VTH. From this fact, it can be found that the driving currents I41 and I42 have no effect by their variations, As a result, the circuit shown in FIG. 11 also makes it possible to stably supply a constant current at a practical operation level. The driving currents I41 and I42 can be taken out in the same way as in the third embodiment.

Sixth Embodiment

Figure 12:
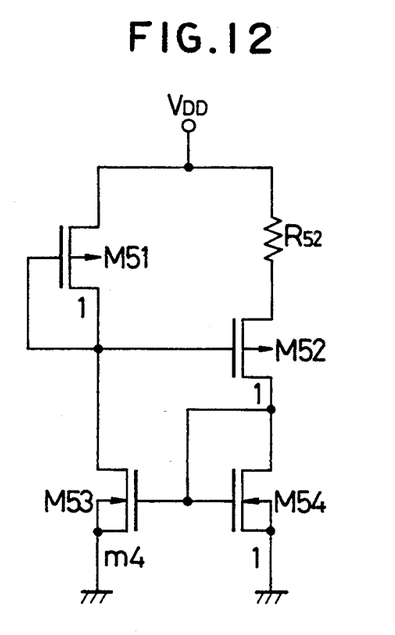
FIG. 12 is a circuit diagram of a constant-current circuit according to a sixth embodiment of this invention.

FIG. 12 is a circuit diagram of a constant-current circuit according to a sixth embodiment of this invention, which comprises two p-channel MOS transistors M51 and M52, which are equivalent to the n-channel MOS transistors M41 and M42 of the fifth embodiment, and two n-channel MOS transistors M53 and M54, which are equivalent to the p-channel MOS transistors M43 and M44 of the fifth embodiment.

In FIG. 12, the source of the p-channel MOS transistor M51 is directly applied with a constant voltage VDD. the drain thereof is connected to the drain of the n-channel MOS transistor M53, and the gate and drain thereof are connected to each other. The source of the p-channel MOS transistor M52 is applied through a resistor R52 with the constant voltage VDD, the drain thereof is connected to the drain of the n-channel MOS transistor M54, and the gate thereof is connected to the source of the transistor M51. The transistors M51 and M52 constitute a Widlar current mirror circuit.

The source of the n-channel MOS transistor M53 is directly grounded, and the drain thereof is connected directly to the drain of the transistor M51. The source of the n-channel MOS transistor M54 is directly grounded, and the drain thereof is connected to the drain of the transistor M52. The gates of the transistors M53 and M54 are connected in common to each other to be connected the drain of the transistor 54. The transistors M53 and M54 constitute a simple current mirror circuit for driving the transistors M51 and M52.

In this embodiment, the capacity ratio of the transistors M51 and M52 to be driven is 1:1, and the capacity ratio of the transistors M53 and M54 constituting the simple current mirror circuit is m4:1 (m4>1, or m4<1). As a result the ratio of the driving current of the transistor M51 and that of the transistor M52 when operating becomes m4:1.

In this sixth embodiment, the transistors to be used are made inverse in channel polarity to the corresponding ones in the fifth embodiment thereby to be operated similarly thereto, so that Eqs. (61) to (70) already described in the fifth embodiment can be similarly established, which means that the same characteristics as those of the fifth embodiment are obtainable.

As described above, in each of the constant-current circuits according to the third to sixth embodiments of this invention, two MOS transistors to be driven are operated at a constant current ratio, thus being capable of generating driving currents with no effect by the variation of the source voltage and the dispersion of the threshold voltage. Accordingly, the dispersion of an output current can be made small with respect to the deviation in production and yet, the current can be set independently of the threshold voltage. Consequently, a constant-current circuit adapted to be used for making a CMOS integrated circuit.

What is claimed is:

1. A temperature sensor circuit comprising:
a differential pair circuit; said differential pair circuit including a first MOS transistor and a second MOS transistor which are different in gate-width and gate-length ratio from each other, a load circuit for said first and second MOS transistors, and a constant current source for driving said first and second MOS transistors; and
a feedback circuit; said feedback circuit receiving an output of said differential pair circuit and feedback-controlling said differential pair circuit so that a drain current of said first MOS transistor and a drain current of said second MOS transistor are made equal to each other;
wherein a reference voltage is applied to an input end of said first MOS transistor and an output of said feedback circuit is applied to an input end of said second MOS transistor, and an output voltage proportional to temperature is derived from said input ends of said first MOS transistor and said second MOS transistor.

2. A temperature sensor circuit as claimed in claim 1, wherein
said first MOS transistor has a gate connected to one of an output terminal pair which is applied with said reference voltage,
said second MOS transistor has a gate connected to the other of said output terminal pair which is applied with an output from said feedback circuit, and
said output voltage proportional to temperature is derived from said output terminal pair.

3. A temperature sensor circuit as claimed in claim 1, wherein said load circuit is a current mirror circuit.

4. A temperature sensor circuit as claimed in claim 3, wherein said current mirror circuit is composed of a third MOS transistor and a fourth MOS transistor which are equal in gate-width and gate-length ratio to each other.

5. A temperature sensor circuit as claimed in claim 4, wherein
said feedback circuit is composed of a level shift circuit including a fifth MOS transistor, and an output stage circuit including a sixth and seventh MOS transistors having a complementary structure,
an input end of said fifth MOS transistor and an input end of said sixth MOS transistor are respectively applied with an output of said differential pair circuit, and
said input end of said second MOS transistor is connected to a connection point of said sixth and seventh MOS transistors.

6. A temperature sensor circuit comprising:
a differential pair circuit having first and second MOS transistors different in gate-width and gate-length ratio from each other to be driven through a first constant current source;
a current mirror circuit having third and fourth MOS transistors different in gate-width and gate-length ratio from each other and acting as a load circuit of said differential pair circuit; and
a feedback circuit for feeding back an output of said current mirror circuit to an input end of said second MOS transistor of said differential pair circuit so that a ratio in value of a drain current of said first MOS transistor and a drain current of said second MOS transistor is made equal to a mirror ratio of said current mirror circuit;
wherein said mirror ratio is a ratio of gate-width and gate-length ratios of said third and fourth MOS transistors;
wherein a reference voltage is applied to an input end of said first MOS transistor and an output of said feedback circuit is applied to an input end of said second MOS transistor, and an output voltage proportional to temperature is derived from said input ends of said first MOS transistor and said second MOS transistor.

7. A temperature sensor circuit as claimed in claim 6, wherein said feedback circuit comprises a complementary circuit using two MOS transistors different in polarity from each other.

8. A temperature sensor circuit as claimed in claim 7, wherein
said feedback circuit is composed of a level shift circuit including a fifth MOS transistor, and an output stage circuit including a sixth and seventh MOS transistors having a complementary structure,
an input end of said fifth MOS transistor and an input end of said sixth MOS transistor are respectively applied with an output of said differential pair circuit, and
said input end of said second MOS transistor is connected to a connection point of said sixth and seventh MOS transistors.

9. A temperature sensor circuit as claimed in claim 8, wherein
a channel-polarity of said first and second MOS transistors and that of said third and fourth MOS transistors are different from each other to form a complementary structure.

* * * * *

UNITED STATES PATENT AND TRADEMARK OFFICE
CERTIFICATE OF CORRECTION

PATENT NO. : 5,357,149

DATED : October 18, 1994

INVENTOR(S) : Katsuji KIMURA

It is certified that error appears in the above-identified patent and that said Letters Patent is hereby corrected as shown below:

Col. 2, line 44, delete "ID61=", insert --ID62=--;

Col. 6, line 30, delete "Mt", insert --M1--;

Col. 8, line 32, delete "dram", insert --drain--;

Col. 9, line 21, delete "lead", insert --Ioad--;

Col. 9, line 54, after "stage circuit", insert --13--;

Col. 10, line 62, delete "178", insert --½--;

Col. 13, line 22, delete "3/2", insert --½--;

Col. 14, line 55, delete "42", insert --44--.

Signed and Sealed this

Seventh Day of March, 1995

Attest:

BRUCE LEHMAN

Attesting Officer

Commissioner of Patents and Trademarks